United States Patent [19]

Tuck et al.

[11] Patent Number: 5,100,218
[45] Date of Patent: Mar. 31, 1992

[54] THERMAL IMAGING OPTICAL SYSTEM

[75] Inventors: Michael J. Tuck; Michael Roberts, both of Clwyd, United Kingdom

[73] Assignee: Pilkington P.E. Limited, North Wales, United Kingdom

[21] Appl. No.: 350,141

[22] Filed: May 10, 1989

[30] Foreign Application Priority Data

May 20, 1988 [GB] United Kingdom ............... 8811980

[51] Int. Cl.⁵ .............................. G02B 5/24
[52] U.S. Cl. ................................... 359/234; 250/331; 359/356
[58] Field of Search ............ 250/331, 333, 330; 350/1.1

[56] References Cited

U.S. PATENT DOCUMENTS

| | | | |
|---|---|---|---|
| 4,166,953 | 9/1979 | Menke et al. | 250/333 |
| 4,322,620 | 3/1982 | Steinhage | 250/333 |
| 4,342,941 | 8/1982 | Steinhage | 313/374 |
| 4,594,507 | 6/1986 | Elliott et al. | 250/331 |
| 4,670,654 | 7/1987 | Ross | 250/331 |
| 4,751,387 | 6/1988 | Robillard | 250/330 |

FOREIGN PATENT DOCUMENTS 2205705A 12/1988 United Kingdom .

Primary Examiner—Bruce Y. Arnold
Assistant Examiner—Jay Patrick Ryan
Attorney, Agent, or Firm—F. Eugene Davis, IV

[57] ABSTRACT

This invention is concerned with a thermal imaging optical system finding utility as an individual weapon sight. The system comprises an infra-red objective lens including a chopper blade together with front and back elements with an adjustable element therebetween. Infra-red radiation is received by the objective lens which also incorporates an internal substantially collimated plane polarized visible light source which illuminates a liquid crystal. The path of the infra-red and visible light which is directed to the liquid crystal cell, is repeatedly interrupted by the chopper blade. Changes in the liquid crystal cell due to the infra-red radiation transmitted by the objective lens are caused to modulate the plane polarized visible light transmitted through the liquid crystal cell to generate a visible image. This image passes through a relay inverting system and is detected by a visible light detector and viewed through an eyepiece.

18 Claims, 2 Drawing Sheets

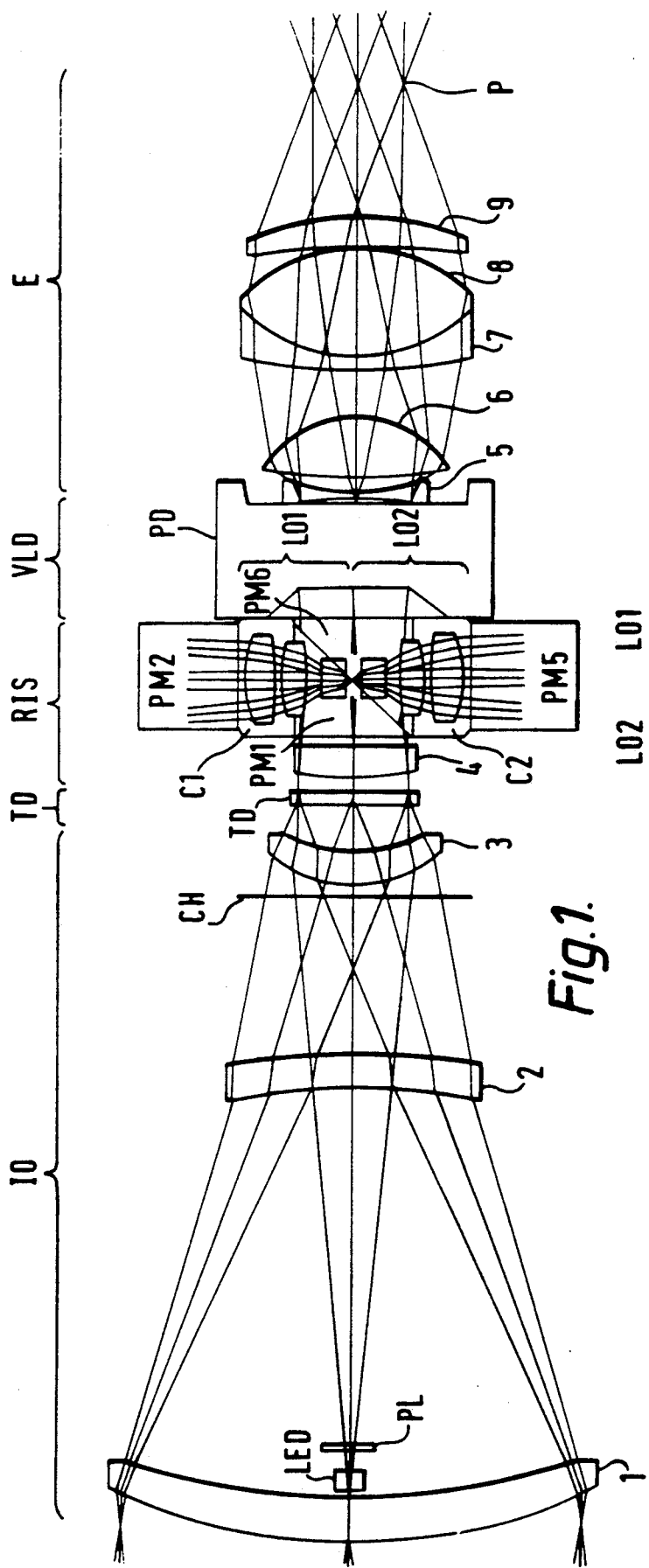
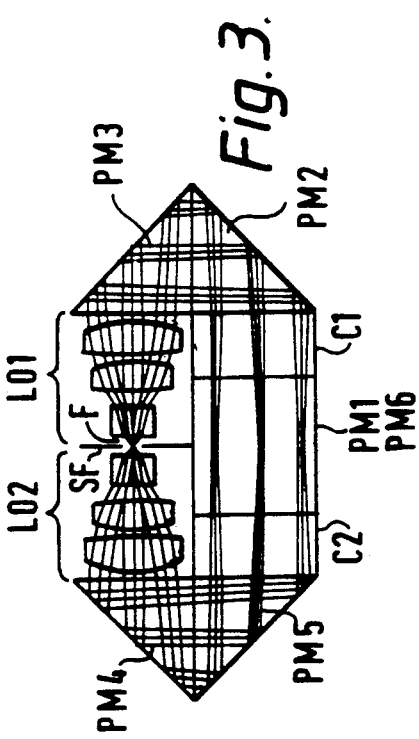

THERMAL IMAGING OPTICAL SYSTEM

BACKGROUND OF THE INVENTION

The present invention relates to a thermal imaging optical system which finds utility as an individual weapon sight.

SUMMARY OF THE INVENTION

According to the present invention there is provided a thermal imaging optical system comprising, an infra-red objective lens for receiving infra-red radiation which has an internal associated substantially collimated plane polarised visible light source and an interrupter means adapted for repeatedly interrupting the plane polarised visible light and infra-red radiation, and a thermal detector, wherein the plane polarised visible light source illuminates the thermal detector through at least part of the objective lens and wherein changes in the thermal detector due to the infra-red radiation transmitted by the objective lens are caused to modulate the plane polarised visible light transmitted through the thermal detector to generate a visible image.

The optical system preferably further includes a relay optical inverting system for inverting said image, visible light detecting means for detecting the image and magnifying means for magnifying the image.

Preferably the objective lens includes at least a front element, a back element and a moveable element therebetween. Advantageously the moveable element and the back element are arranged to have a front focus point adjacent the front element at which the visible light source can be located for collimation of the visible light.

The objective lens may take a folded configuration and include a mirror positioned at 45° to the optical axis.

The plane polarised light source may conveniently be an illumination diode in the form of a light emitting diode (LED) having a polariser mounted in front of it to provide the plane polarised light. The objective lens may operate in the 8 $\mu$m to 12 $\mu$m waveband and the LED illumination may be in the 0.46 $\mu$m to 0.63 $\mu$m waveband.

The interrupter means may take the form of a mechanical rotatable chopper blade which blocks the light received by the thermal detector repeatedly. The frequency of the chopping action is preferably between 25 Hz and 30 Hz.

The chopper blade may be positioned between the moveable element and the back element and is preferably adjacent the back element.

A thermal detector suitable for the optical system is preferably a liquid crystal cell.

The relay optical inverting system is preferably a prismatic arrangement which includes prisms and at least one glass spacer so arranged as to form a compact unit.

Preferably the visible light detecting means is a proximity diode or an image intensifying tube having a gain of say $\times 20$ to $\times 30$.

Alternatively a charged coupled device (CCD) may be used as the visible light detecting means in combination with a miniature cathode ray tube serving as a display device.

The magnifying means is preferably an eyepiece lens and it may be advantageous that the eyepiece lens includes an adjustable graticule and further may advantageously be conveniently adapted for the mounting of second and third generation image intensifier tubes.

The invention will be readily understood from the following description of two exemplary embodiments which should be read in conjunction with the accompanying drawings in which;

BRIEF DESCRIPTION OF THE DRAWINGS

FIG. 1 shows one example of an optical system according to the invention;

DESCRIPTION OF THE PREFERRED EMBODIMENT

Figure 2:
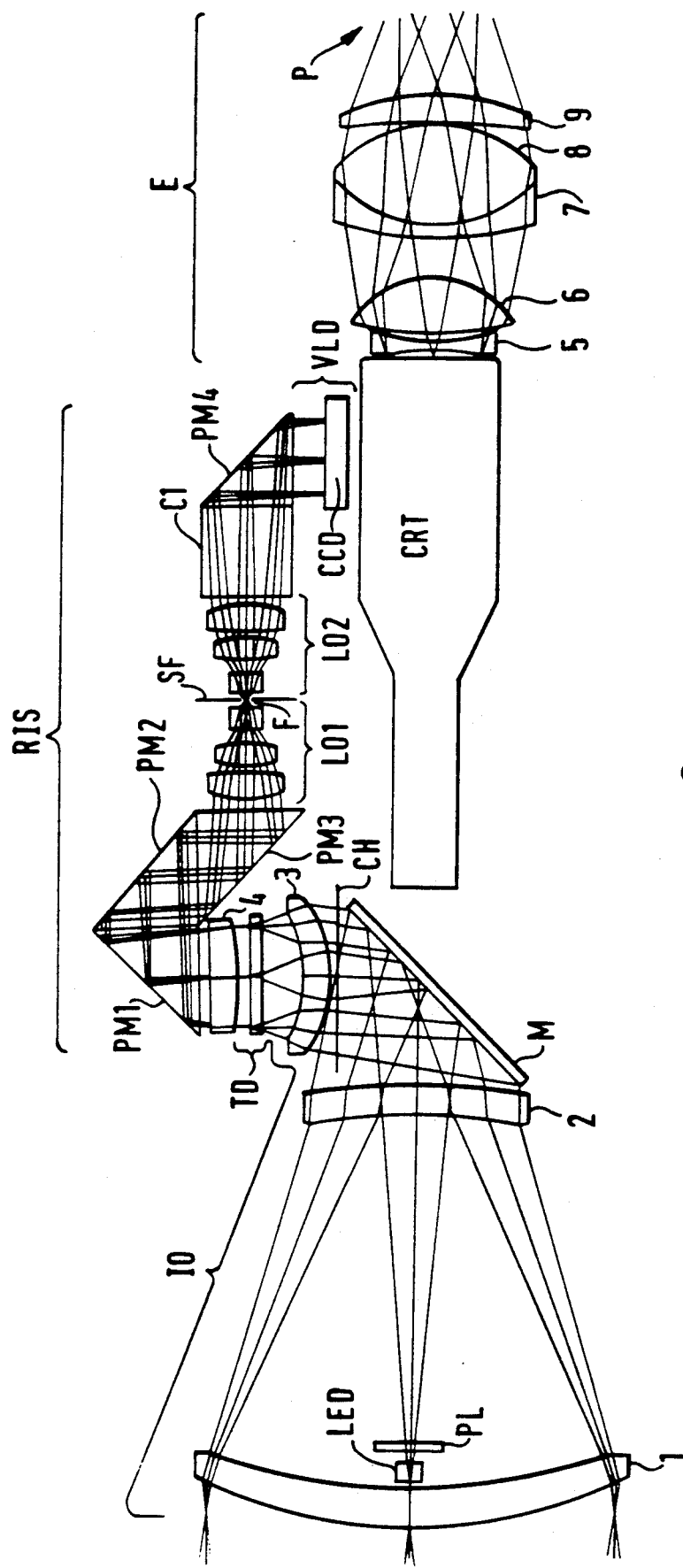
FIG. 2 shows an alternative example of optical system according to the invention; and, FIG. 3 shows a diagrammatic representation of relay optics.

Referring to the drawings, it will be understood from FIG. 1 that the basic optical system comprises a infra red objective lens IO, a thermal detector TD, an optical relay inverting system RIS, a visible light detector VLD and a magnifier in the form of en eyepiece lens E.

The infra red objective IO comprises three elements 1, 2 and 3 which are adapted for operation in the 8 $\mu$m to 12 $\mu$m waveband. The front element 1, which in use is the lens element within the objective nearest to a distant scene or object from which infra-red radiation is received, is a positive meniscus element convex to the front made from germanium. The middle element 2, which is moveable, is a negative meniscus element concave to the front. The back element 3, being the lens element within the objective furthest from the scene or object, is a positive meniscus element convex to the front. The middle and back elements 2 and 3 are made from either zinc sulphide of the wideband type (known by the trade names as MULTISPECTRAL or CLEARTRAN) or zinc selenide. The choice of material for the middle element 2 (between the front and back elements) and the back element 3 depends on the wavelength of the visible light chosen to illuminate the thermal detector TD i.e. blue: Zinc Sulphide, red: Zinc Selenide.

Accordingly the infra red objective IO has an associated internal visible light source in the from of either a blue or red light emitting illumination diode LED. It is necessary to illuminate the thermal detector TD with substantially collimated and polarised visible light for its operation, and to achieve this a polariser PL is mounted in front of the light emitting diode LED to provide plane polarised light.

The moveable element 2 and the back element 3 of the objective IO are designed to have a front focus point near the front element. The lens element 2 and 3, together with a positive lens element 4 adjacent the thermal detector TD and associated with the optical relay inverting system RIS, effectively form an illumination system or condenser optics such that the image of the light emitting diode LED, placed at the focus point, is formed at the aperture stop of the optical relay inverting system RIS. The light emitting diode LED illuminates the thermal detector TD, which takes the form of a liquid crystal cell, with substantially collimated polarised visible light. Changes in the liquid crystal cell due to the infra-red thermal energy received from the scene or object of the infra-red objective IO and focussed on to the thermal detector modulate the polarised visible light transmitted through the liquid crystal cell to produce a visible image within the cell.

An interrupting means CH is placed in the infra-red objective IO in front of the back element. This takes the form of a mechanical rotatable chopper blade CH which blocks the infra-red radiation and visible light received by the thermal detector TD repeatedly during rotation. The frequency of chopping is between 25 Hz and 30 Hz. By blocking the incident radiation to the thermal detector TD by chopping, the thermal detector TD has time to cool which prevents thermal diffusion within the device, and subsequent blurring of the image produced by the device. Athermalisation and focussing of the infra red objective lens is performed by positional adjustment of the internal moveable element 2 manually.

The specification for the infra-red objective IO is as follows:

| Waveband | 8 μm to 12 μm |
|---|---|
| Focal Length | 102.5 mm |
| F. No. | F/1.37 |
| Field of View | 10° total |
| Image size | 18 mm diameter |
| Transmission | approximately 90% |
| Vignetting | None |
| Length | 120 mm |

The thermal detector TD visible light illumination optics is as follows:

| F. No. | F/5.3 |
|---|---|
| Waveband | 0.46 μm to 0.63 μm |
| Magnification | 1:1 |

The relay optical inverting system RIS, also illustrated in FIG. 3, serves to invert the image from the thermal detector TD. The relay optical inverting system can incorporate a spatial filter SF, as shown in FIG. 2 and FIG. 3, generally for reducing noise.

Light from that image is transmitted through the intermediary plano convex positive lens element 4 and the relay optics also acts as a spatial filter generally for reducing noise. The relay optical inverting RIS system is a prismatic arrangement which comprises prisms PM1, PM2, PM3, PM4, PM5 and PM6 together with glass block spacers C1 and C2 together with complementary lens optics LO1 and LO2 which are so arranged that the unit is very compact.

Thus, visible light transmitted by the image at the thermal detector TD enters the relay optical inverting system RIS at the prism PM1 where the beam is reflected through 90° and through an adjacent glass spacer block C1 to an adjacent prism PM2. At prism PM2 the beam is again reflected through 90° where it is transmitted to a further adjacent prism M3 where the beam is again reflected through 90° and transmitted through converging lens optics LO1 to a point F.

The beam is transmitted onward through converging lens optics LO2 into yet a further prism PM4. At prism PM4, the beam is reflected through 90° and transmitted into an adjacent prism PM5 where it is reflected through 90°, transmitted through an adjacent glass spacer block C2 and onward to the prism PM6.

The prism PM6 reflects the beam through 90° and it is transmitted from the relay optical inverting system RIS to a proximity diode PD.

| Wavelength | 0.46 μm or 0.63 μm (depending on the |
|---|---|
| | type of LED used) |
| Magnification | 1:1 |
| F. No. | F/15 input and output |
| Object/Image size | 18 mm diameter |
| Vignetting | None |
| Length | 30 mm (folded configuration, FIG. 1) |

Two visible light detector VLD options are proposed. The first and preferred option is the provision of a proximity diode PD or an image intensifier tube. To use this option the image intensity, or input to the diode or tube, must be great enough for the diode or tube to be suitably activated. The gain of such a device is of the order of ×20 to ×30.

The second option (see FIG. 2) is to use a charge coupled device CCD as the visible light detector VLD together with a miniature cathode ray tube device CRT as a display.

Finally, the eyepiece E serves as a magnifier through which the displayed output is viewed and this can be any suitable standard magnifier lens. The one illustrated comprises five elements 5,6,7,8 and 9, 5 being a bi-concave negative element, 6 being a bi-convex positive element, 7 and 8 being a doublet including a meniscus negative element 7 concave to the rear cemented to an equi-biconvex positive element 8, and a single positive meniscus element 9 convex to the rear. The magnified image is viewed by positioning the eye at the exit pupil P. The optical system may be used for an individual weapon sight and it is possible to include in the rear portion an adjustable graticule. The eyepiece housing may also be suitably adapted to enable the mounting of second and third generation image intensifier tubes.

The eyepiece magnifier specification is as follows:

| Waveband | 0.50 μm to 0.58 μm |
|---|---|
| Focal Length | 25 mm |
| Field of view | 40° total |
| Length | 45 mm (excluding eye relief). |

Referring to FIG. 2, which shows an alternative arrangement of the invention, it should be understood that components of this arrangement which correspond with those shown in FIG. 1 are identically designated (excepting the prism designations) for simplicity.

The main difference between this arrangement and that shown in FIG. 1 is that the infra-red objective lens IO is folded, a mirror M being positioned at 45° to the optical axis to deflect the infra-red light and polarised visible light towards the liquid crystal cell TD.

The relay optics, shown schematically, is slightly amended, however the effect of invertion of the image produced by the liquid crystal cell is achieved in a manner similar to that shown in FIG. 1.

Thus, visible light transmitted by the image at thermal detector TD enters the relay optical inverting system RIS at prism PM1 where the beam is reflected through 90° and transmitted to an adjacent prism PM2. At prism PM2 the beam is again reflected through 90° and transmitted to a further adjacent prism PM3 where it is reflected through 90° and transmitted through converging lens optics LO1.

The beam is transmitted onward through converging lens optics LO2 through a glass spacer block C1 to an adjacent prism PM4. At prism PM4 the beam is reflected through 90° and transmitted from the relay optical inverting system RIS to a charge coupled device CCD. It will be appreciated by those skilled in the art that the electronic circuitry required to operate the device has not been shown. However, the particular arrangements for electrically coupling the charge coupled device CCD and the cathode ray tube CRT, and the control arrangements for the chopper blade CH, thermal detector TD and light emitting diode LED can be readily implemented by the person skilled in the art.

What is claimed is:

1. A thermal imaging optical system comprising in combination:
    an infra-red objective lens for receiving infra-red radiation, the objective lens having an associated internal substantially collimated plane-polarised visible light source, and interrupter means; and
    a thermal detector operable to modulate plane-polarised visible light from the light source in response to infra-red radiation received via the objective lens thereby to generate a visible image;
    the arrangement of the objective lens, its visible light source and interrupter means, and the thermal detector being such that both the received infra-red radiation and the plane-polarised visible light are repeatedly interrupted by the interrupter means prior to reaching the detector, and the plane-polarised visible light illuminates the detector through at least part of the objective lens.

2. A system as claimed in claim 1, further comprising in combination;
    a relay optical system for inverting said image;
    visible light detecting means for detecting the image; and,
    magnifying means for magnifying the image.

3. A system as claimed in claim 2, wherein the relay optic inverting system is a prismatic arrangement which includes prisms and at least one glass spacer.

4. A system as claimed in claim 2, wherein the visible light detecting means is a charged coupled device in combination with a miniature cathode ray tube.

5. A system as claimed in claim 2, wherein the magnifying means is an eyepiece lens.

6. A system as claimed in claim 1, wherein the objective lens includes at least a front element, a back element and a moveable element therebetween.

7. A system as claimed in claim 6, wherein the moveable element and the back element are arranged to have a front focus point adjacent the front element at which the visible light source is located for collimation of the visible light.

8. A system as claimed in claim 1, wherein the objective lens is a folded configuration and includes a mirror positioned at 45° to the optical axis.

9. A system as claimed in claim 1, wherein the plane polarised light source is an illumination diode in the form of a light emitting diode having a polariser mounted in front of it to provide the plane polarised light.

10. A system as claimed in claim 9, wherein the illumination from the light emitting diode is in the 0.46 $\mu$m to 0.63 $\mu$m waveband.

11. A system as claimed in claim 1, wherein the objective lens operates in the 8 $\mu$m waveband.

12. A system as claimed in claim 1, wherein the interrupter means takes the form of a mechanical rotatable chopper blade which blocks the light received by the thermal detector repeatedly.

13. A system as claimed in claim 12, wherein the frequency of the chopping action of the rotatable chopper blade is between 25 Hz and 30 Hz.

14. A system as claimed in claim 12, wherein the objective lens includes at least a front element, a back element and a moveable element therebetween and the chopper blade is positioned between the moveable element and the back element and is adjacent the back element.

15. A system as claimed in claim 1, wherein the thermal detector is a liquid crystal cell.

16. A system as claimed in claim 1, wherein the visible light detecting means is a proximity diode or an image intensifying tube.

17. A thermal imaging optical system comprising in combination:
    an infra-red objective lens for receiving infra-red radiation, the objective lens having:
        a front element,
        a back element,
        an internal plane-polarised visible light source, and interrupter means; and
    a thermal detector operable to modulate plane-polarised visible light from the light source in response to infra-red radiation received via the objective lens thereby to generate a visible image;
    wherein the interrupter means and the back element are located between the visible light source and the detector, such that both the received infra-red radiation and the plane-polarised visible light are repeatedly interrupted by the interrupter means prior to reaching the detector, and the plane-polarised visible light illuminates the detector in a substantially collimated form.

18. A system as defined in claim 17, further comprising:
    a prismatic relay optical system for inverting said visible image, and
    visible light detecting means for detecting the image.

* * * * *